Jan. 6, 1970 W. J. KIEFER 3,487,892
POSITIVE DISPLACEMENT LUBRICATION SYSTEM
Filed May 31, 1968

INVENTOR
WILLIAM J. KIEFER
BY Frank H Thomson
ATTORNEY

United States Patent Office 3,487,892
Patented Jan. 6, 1970

3,487,892
POSITIVE DISPLACEMENT LUBRICATION SYSTEM
William J. Kiefer, 25 Baldwin Ave., Addison, N.Y. 14801
Filed May 31, 1968, Ser. No. 733,595
Int. Cl. E04g 1/00; F04b 17/00; F01m 1/06
U.S. Cl. 184—27                                    4 Claims

ABSTRACT OF THE DISCLOSURE

A positive displacement lubrication system which permits a maximum degree of adjustment of the amount of lubricant flow. Lubricant from a source fills a pumping chamber. An intensifier type pumping element is acted on by fluid from the same source to move the lubricant out of the pumping chamber to the device to be lubricated. The volume of lubricant supplied to the device to be lubricated can be varied by varying the length of the stroke of the pumping element and by varying the frequency of movement of the pumping element.

BACKGROUND OF THE INVENTION

This invention relates to a lubricating system which supplies a measured amount of lubricant to the device to be lubricated. The volume of lubricant flow is infinitely variable between certain limits.

Prior to this invention, lubricators which can be adjusted to a minimum flow of lubricant have not been available. Most prior lubricating systems become erratic and unstable when adjusted to a minimum flow of lubricating fluid. Those systems which are designed to supply a minimum or small amount of lubricating fluid to the device to be lubricated do not operate satisfactorily when it is desired to increase the amount of lubrication. They are usually unnecessarily complex and do not provide adequate lubricant pressures.

Some prior lubricators are adjustable by varying the length of the pumping element stroke. Others, such as that shown in U.S. Patent No. 3,337,002, are varied by providing a plurality of pumping elements, each having different stroke lengths. In the latter instance, adjustment is provided by actuating the pumping element which gives the proper volume of lubricant. Each of these systems is necessarily complex and, as a result, often unreliable.

SUMMARY

It is therefore the principal object of this invention to provide a positive displacement lubrication system in which the amount of lubrication may be adjusted to a minimum.

It is a further object of this invention to provide a lubricating system which permits infinite adjustment of lubricant volume between limits.

It is a further object of this invention to provide a lubricating system which is of simple construction and contains a minimum of moving parts.

In general, these and other objects will be carried out by providing a lubrication system comprising: a source of lubricating fluid; means defining a pumping chamber having an inlet and an outlet; a first conduit for supplying lubricant fluid from said source to the inlet of said pumping chamber; a pumping element movable in said pumping chamber for forcing lubricant out of said pumping chamber to a device to be lubricated; means for periodically moving said pumping element in a direction for forcing lubricant out of said pumping chamber; and means for adjusting the length of travel of said pumping element to thereby vary the volume of lubricant forced out of said pumping chamber; and said means for moving said pumping element including means for adjusting the frequency of movement of said pumping element.

BRIEF DESCRIPTION OF THE DRAWING

This invention will be described in connection with the annexed drawings wherein.

DESCRIPTION OF THE PREFERRED EMBODIMENT

Figure 1:
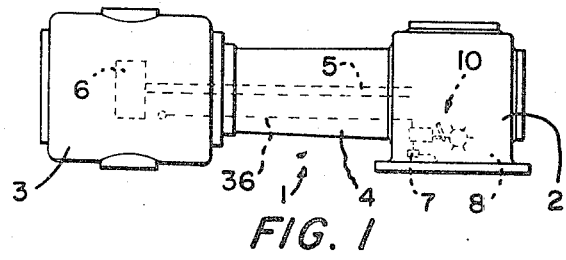
FIG. 1 is a plan view of a compressor employing this invention.

The invention will be described for use on a compressor although it is intended that it be applicable to other types of machines which require a positive lubrication system. The system is particularly adaptable to compressors, however, because of its compactness and simplicity of design. Referring to FIG. 1, the compressor is generally indicated at 1 and includes a drive unit 2 and a compression cylinder 3. A casing 4 connects the drive unit 2 and compressive cylinder 3. A piston rod 5 is reciprocated by the drive means 2 and in turn reciprocates a piston in the cylinder unit 3. The engine chamber 2 includes a lubricating fluid source generally indicated at 8 and a pump means 7. The valving and pumping arrangement of this invention is generally indicated at 10.

The pumping system includes a casing or lubricator body 11 having an inlet connection 12 which receives fluid at a predetermined pressure from reservoir 8 by way of pump 7. An inlet passage 13 provides communication between the inlet connection 12 and inlet passage 14 which leads to a pumping chamber 18. A check valve 15 is interposed in the inlet passage 13, 14 to prevent back flow of lubricating fluid during the pumping operation.

A pumping element 20 in the form of an intensifier having a high pressure end 21 and a low pressure end 22 is mounted for reciprocal movement within a chamber 19 which includes the pumping chamber 18. The high pressure end 21 of the pumping element 20 extends into the pumping chamber 18 to act on the lubricating fluid supplied thereto by passages 13 and 14.

A valve body 24 is mounted on the casing 11 and includes an inlet connection 25 in communication with the source of fluid 8 by way of the pump 7. The valve body 24 has a longitudinal passage 26 therein having a valve stem 27 mounted for reciprocal movement therein. The stem 27 has a reduced diameter portion along its length which defines with the passage 26 and annular flow path 28. The valve stem 27 is biased outwardly by means of a suitable spring 33. A passage 29 provides communication between the annular flow path 28 and the low pressure side 22 of the pumping element 20. A vent 31 is provided in the passage 26 to permit the valve stem 27 to be moved inwardly.

Figure 2:
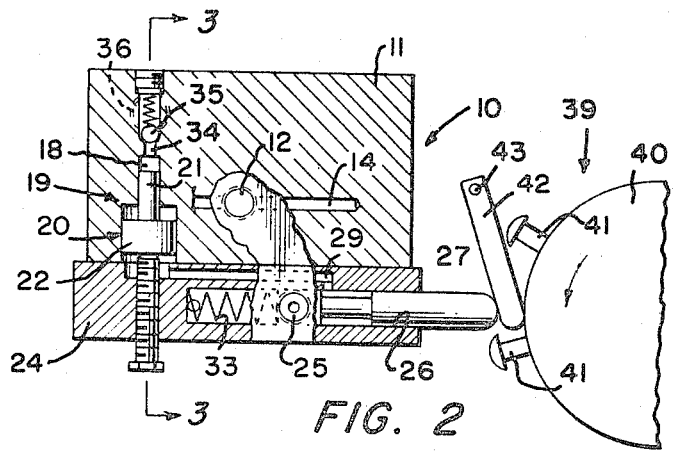
FIG. 2 is a sectional view of a portion of the lubrication system of this invention with a portion shown in elevation for purposes of clarity.

In the position shown in FIG. 2, the lubricating fluid from the reservoir 8 is blocked at the inlet connection 25 by the valve stem 27. When the valve stem 27 is moved inwardly, communication is provided between the inlet connection 25 and the passage 29 through an annular passage 28.

In order to move the valve stem 27 inwardly, a valve operating means, generally indicated at 39 has been provided. This includes a wheel 40 which is rotated by the drive means 2 and is coordinated with such drive means to rotate at a suitable speed such as one revolution for each cycle of the piston 6. The wheel 40 is provided with at least one nob 41 which, as the wheel rotates, contacts a lever arm 42 which is pivoted about a point 43. The nob 41 moves the arm 42 outwardly to push the valve stem 27.

Figure 3:
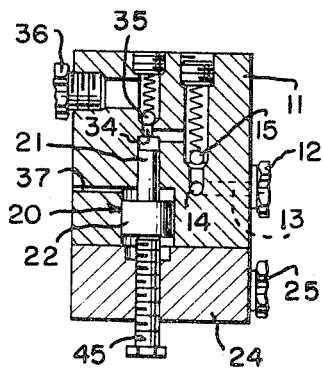
FIG. 3 is a sectional view taken on the line 3—3 of FIG. 2 in the direction of the arrows.
Figure 4:
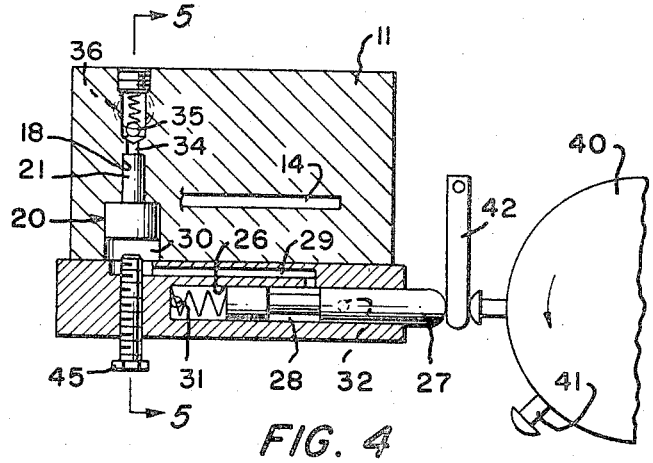
FIG. 4 is a view similar to FIG. 2 but in a different operative position.
Figure 5:
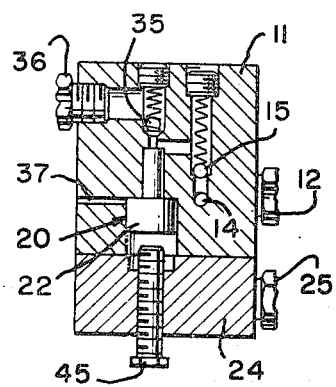
FIG. 5 is a sectional view similar to FIG. 3 but taken on the line 5—5 of FIG. 4 to show the operative position of FIG. 5.

In operation, fluid under a predetermined pressure is supplied through the inlet 12, passages 13 and 14 to the pumping chamber 18. A suitable check valve 35 is positioned in an outlet passage 34 from the pumping chamber 18. This check valve has sufficient strength so that it can not be opened by the pressure of the lubricant from the pump 7 or by the vacuum developed on the suction stroke of the compressor. The pumping chamber is thus filled with a predetermined amount of lubricant. As the wheel 40 rotates and the nob 41 raises the lever arm 42 to bias the valve stem 27 inwardly, fluid from the reservoir 8 and pump 7 at the same pressure as that supplied to the inlet 12 passes from inlet 25, annular passage 28 and passage 29 to the low pressure to the low pressure end 30 of the chamber 19. Since the intensifier or pumping element 20 has a larger diameter at the low pressure end, the pumping element will move upwardly (FIGS. 4 and 5) positively forcing fluid out of the pumping chamber 18 through an outlet passage 34. The pressure of the fluid is sufficiently high to overcome the check valve 35. Lubricant then flows through outlet 36 to the cylinder of the compressor or other part to be lubricated. A suitable vent 37 permits upward movement of the pumping element without compression of air. No additional fluid can enter the pumping chamber because pressure in the pumping chamber 18 is greater than the pressure of fluid being supplied from pump 7. Thus, a measured amount of lubricant, equal to the volume of the pumping chamber 18 is positively supplied to the device to be lubricated. As the wheel 40 continues to rotate, the nob 41 passes the arm 42 permitting the valve stem 27 to move outwardly and return to the position shown in FIG. 2. Fluid in the passage 29 is vented through the vent 32 back to the reservoir 8. Since the low pressure side 22 of the intensifier 20 is now at atmospheric pressure and pressure on side 21 is at the pressure of fluid from pump 7 due to a new supply of lubricant from the inlet passages 13 and 14, the pumping element will return to the position shown in FIGS. 2 and 3.

In order to vary the amount of lubricant supplied to the device to be lubricated, two means of adjustment have been provided. The length of the stroke of the pumping element 20 may be varied by means of an adjusting screw 45. Inward movement of the adjusting screw 45 reduces the volume of pumping chamber 18 and hence the volume of fluid supplied to the device to be lubricated with each movement of the pumping element. Outward movement of the screw 45 increases the size of the pumping chamber.

The frequency of operation of the lubrication device during each cycle of the machine may also be varied. This is accomplished by adding additional actuating nobs 41 may be added to the wheel 40. For each rotation of the wheel 40, the pumping element 20 will be actuated a number of times equal to the number of actuating nobs 41 and positively displace a volume of fluid equal to the volume of the pumping chamber 18 times the number of nobs 41.

If desired, the speed of rotation of the wheel 40 may also be made adjustable to permit further adjustment of the volume of lubricant supplied to the device to be lubricated. This speed of rotation and the spacing between nobs 41 must, of course, be coordinated to insure ample time for the valve stem 27 to return to the position of FIG. 2 and the pumping chamber to be resupplied with lubricant. Although the invention has been shown with only a single pumping element; if desired the body 11 may be provided with a plurality of pumping chambers and pumping elements, each operated by the opening and closing of a single valve 27. In this instance, a single inlet would supply the several pumping chambers 19. Each pumping element would be used to supply a separate cylinder of a compressor.

It should be readily apparent that the volume of lubricant supplied to the device to be lubricated is infinitely adjustable between limits. Regardless of the volume of fluid flow, the system is consistent. Even at minimum volume positive displacement is achieved.

It is apparent from the foregoing that the objects of this invention have been carried out. Although the foregoing is a description of a preferred embodiment certain modifications will be obvious therefrom.

I claim:
1. A lubricating system comprising:
   a source of lubricating fluid under a predetermined pressure;
   means defining a pumping chamber;
   first conduit means for conducting fluid under a predetermined pressure from said source to said pumping chamber;
   second conduit means for conducting lubricating fluid from said pumping chamber to a device to be lubricated;
   a pumping element movable in said pumping chamber for forcing lubricating fluid under an increased pressure out of said pumping chamber into said second conduit;
   third conduit means for selectively conducting fluid at said predetermined pressure from said source to one side of said pumping element for moving said pumping element in a direction for forcing lubricant out of said pumping chamber;
   valve means for selectively opening and closing said third conduit;
   means for adjusting the length of travel of said pumping element to thereby vary the volume of lubricant forced out of said pumping chamber; and
   means for actuating said valve means including means for adjusting the frequency of movement of said pumping element.

2. The lubricating system of claim 1 further comprising first check valve means positioned in said first conduit means for preventing fluid from flowing through said first conduit means toward said source when said pumping element is moved to force fluid out of said pumping chamber.

3. The lubricating system of claim 2 further comprising second check valve means positioned in said second conduit means for preventing said lubricating fluid from flowing directly from said first conduit means to said second conduit means.

4. The lubricating system of claim 1 wherein said pumping element is an intensifier with its low pressure side positioned to be acted on by fluid supplied by said third conduit.

References Cited

UNITED STATES PATENTS

| 2,592,940 | 4/1932 | Monoyer | 103—51 |
| 2,599,195 | 6/1952 | Nemetz | 184—27 |
| 2,864,313 | 12/1958 | Dawson | 103—50 XR |
| 2,876,704 | 3/1959 | Collion et al. | 103—49 |
| 3,263,609 | 8/1966 | Bystricky et al. | 184—27 XR |

FRED C. MATTERN, Jr., Primary Examiner

M. A. ANTONAKAS, Assistant Examiner

U.S. Cl. X.R.

103—50; 184—7

UNITED STATES PATENT OFFICE
CERTIFICATE OF CORRECTION

Patent No. 3,487,892                            January 6, 1970

William J. Kiefer

It is certified that error appears in the above identified patent and that said Letters Patent are hereby corrected as shown below:

In the heading to the printed specification, lines 4 and 5, "William J. Kiefer, 25 Baldwin Ave., Addison, N. Y. 14801" should read -- William J. Kiefer, Addison, N. Y., assignor to Ingersoll-Rand Company, New York, N. Y., a corporation of New Jersey --.

Signed and sealed this 1st day of December 1970.

(SEAL)
Attest:

Edward M. Fletcher, Jr.                      WILLIAM E. SCHUYLER, JR.
Attesting Officer                                Commissioner of Patents